United States Patent Office 3,413,163
Patented Nov. 26, 1968

3,413,163
ARC WELDING FLUX AND METHOD OF
MANUFACTURING THE SAME
Lars Hilding Hillert, Goteborg, Sweden, assignor to
Elektriska Svetsningsaktiebolaget, Goteborg, Sweden,
a corporation of Sweden
No Drawing. Filed Sept. 7, 1965, Ser. No. 485,545
Claims priority, application Sweden, Sept. 7, 1964,
10,700/64
7 Claims. (Cl. 148—23)

ABSTRACT OF THE DISCLOSURE

A flux for the submerged-arc welding process is disclosed consisting of granules, each of which comprises a plurality of particles of different materials agglomerated by a bonding agent consisting substantially of at least one chromium oxide. The production of the welding flux comprises mixing powdered flux ingredients with chromium trioxide, shaping the mixture into compacted bodies, subjecting the bodies to a temperature exceeding the melting point of the chromium trioxide but not exceeding 600° C., and cooling the product. The bodies may have a size exceeding the desired grain size of the flux, in which case the method includes a subdivision step performed before or after the cooling step.

This invention relates generally to fluxes or welding powders for the submerged arc welding of iron or steel. The existing fluxes of this kind usually belong to one or the other of two type generally referred to as prefused fluxes and agglomerated fluxes, respectively. In the prefused fluxes, each granule consists of a fused mixture of the various ingredients. The manufacture of these fluxes is comparatively costly. It is also a disadvantage that metallic alloying or deoxidizing agents required to be present in the flux have to be added as separate grains. In the agglomerated fluxes, each granule comprises a plurality of particles of different materials held together by a bonding agent, usually alkali metal silicate. The agglomerated powder is comparatively cheap, but the hygroscopicity of the alkali metal silicate renders the flux liable to absorb humidity out of the atmosphere with resultant danger of porosity in the weld metal. To remove this disadvantage, various methods of preparing agglomerated fluxes without the use of alkali metal silicate have already been proposed. According to the British patent specification No. 762,980, the powdered fluxed ingredients are mixed with a powdered, prefused glaze composition, the mixture is heated to a temperature sufficient to cause fusion of the glaze composition, and the resulting mass on cooling is reduced to granule form. The British patent specification No. 846,282 describes similar methods in which powdered flux ingredients are mixed with a powdered binder, for instance a powdered glass, and the mixture is compacted into blocks which are fired at a high temperature, for instance 700° or 800° C., and on cooling are crushed into a powder.

The invention concerns a flux for the submerged arc welding of iron and steel, particularly for the welding of steels which contain chromium and/or for welding with steel electrodes containing chromium, consisting of granules each of which comprises a plurality of particles of different materials agglomerated by a bonding agent. The ingredients include slag-forming and fluxing materials and also may include metallic alloying and/or deoxidizing agents. The invention is particularly characterized thereby that at least a substantial part of the bonding agent consists of a chromium oxide.

The welding flux according to the invention has the advantage that the contents of silica and alkali are independent of the proportion of bonding agent employed. It is therefore possible to choose the contents of silica and/or alkali as low as desired, for instance entirely to avoid said constituents when this is desired.

The invention also comprises a particular method of making the improved flux which comprises mixing powdered flux ingredients with chromium trioxide, shaping the mixture into compacted bodies the size of which is at least equal to the required grain size of the flux, subjecting said bodies to a temperature exceeding the melting point of the chromium trioxide but not exceeding 600° C., cooling the product, and, if required, subdividing the bodies into granules, the order of said two last-mentioned steps being arbitrary.

Chromium trioxide melts at 196° C. and can be heated to about 250° C. without decomposition. At temperatures above 250° C., the trioxide is decomposed into lower oxides and oxygen. At 415° C. and higher temperatures chromium oxide ($Cr_2O_3$) only is stable.

The method according to the invention can be varied in many ways. The binding agent (chromium trioxide) can be mixed with the other ingredients either in the form of powdered chromium trioxide ($CrO_3$) or powdered chromic acid ($H_2CrO_4$) or in the form of a watery solution of chromium trioxide. The powder mixture may for instance be moistened with water (or a solution of $CrO_3$) and shaped into grains or granules by any known granulation method, the grains or granules thus obtained being subsequently heated to at least 196° C. According to another possibility, the moistened powder mixture is shaped by pressing or extrusion into blocks or strings, respectively, which are heated to at least 196° C., allowed to cool, and subdivided into granules, or which on drying at a temperature below 196° C. are subdivided into granules which are then heated to a temperature of at least 196° C. in order to develop the bonding action of the chromium trioxide. If the temperature during manufacture remains below 250° C., the bonding agent of the granules will consist of solidified $CrO_3$. As the chromium trioxide is soluble and in the presence of humidity is chemically active, it is usually advisable to increase the temperature to more than 250° C., so that the chromium trioxide is decomposed. Preferably the temperature is raised to at least 415° C., whereby the chromium trioxide is completely converted into chromium oxide ($Cr_2O_3$), which is insoluble and chemically inert at ordinary temperatures. The resulting welding powder or welding flux is distinguished by a particularly small humidity absorption.

In a particularly advantageous form of the method according to the invention, the mixture of the powdered constituents is extruded through one or more apertures at a temperature of 196 to 250° C., the extruded elongated bodies or strings of material being subsequently subdivided into granules. Preferably the extruded material is subsequently subjected to a temperature of at least 415° C.; this second heating step may be performed either before or after the subdivision into granules. In order to facilitate the subdivision of the extruded strings of material into granules, the aperture or apertures through which the material is extruded may be given a cross-sectional shape and size such that at least one dimension (the thickness) of the extruded string or strings is equal to the required grain size. Said subdivision may be carried out immediately on extrusion by submitting the still hot and plastic string to the action of a cutting or hacking device. If desired, said device may be adapted to provide the string with a series of notches or incisions serving to promote a later disintegration of the coated string into discrete granules having a defined size by means of a suitable breaking device.

The proportion of $CrO_3$ in the mixture can be chosen within wide limits. In most cases, a proportion of at least 1% by weight is required in order to provide an adequate bonding action or strength. If not metallurgical reasons demand the use of particularly small contents of $CrO_3$, a proportion of not less than about 3 or 4% is preferably employed. On the other hand, increasing the proportion of $CrO_3$ beyond about 10% mostly results in no further increase of the bonding action or strength of the granules, but may be adopted for fluxes required to provide a slag rich in chromium oxide.

To obtain a complete conversion of the chromium trioxide into chromium oxide ($Cr_2O_3$), a heating temperature in the range 420 to 450° C. is preferably employed. In special cases, particularly when comparatively small contents of $CrO_3$, for instance 2% or less, have to be used, increasing the temperature of the heat treatment above 450° C. may result in some improvement of the bonding action or the granule strength. The upper limit of 600° C. should, however, not be exceeded.

The following examples are given for the purpose of illustrating the invention.

Example I

The following powdered constituents are mixed in the dry state:

| | Wt. percent |
|---|---|
| Calcined bauxite | 8.5 |
| Silica flour | 20 |
| Calcined magnesite | 34 |
| Cryolite | 16 |
| Fluorspar | 9 |
| Chromium trioxide | 8 |
| Ferrosilicon | 4 |
| Cellulose ester | 0.5 |
| | 100.0 |

The mixture is heated to 220° C. and extruded at said temperature to cylindrical strings of 1 mm. diameter in an extrusion press. On emerging from the press the strings are cooled with air and subdivided by means of a breaking device into granules having a length varying between 1 mm. and a few millimeters.

Example II

The following powdered constituents are mixed in the dry state:

| | Wt. percent |
|---|---|
| Silica flour | 8.5 |
| Calcined dolomite | 45 |
| Fluorspar | 10 |
| Rutile | 5 |
| Hausmannite | 10 |
| Ferrosilicon | 7 |
| Nickel powder | 5 |
| Ferromolybdenum | 1 |
| Chromium trioxide | 5 |
| Boric oxide | 3 |
| Cellulose ester | 0.5 |
| | 100.0 |

The mixture is heated to 220° C. and extruded at said temperature to a tape of the thickness 0.8 mm. On cooling, the tape is broken into granules. The granular product is reheated to 520° C. and kept at this temperature for half an hour. The chromium trioxide will be completely converted into $Cr_2O_3$ at 415° C.; the boric oxide starts to fuse at about 450°. The molten boric oxide effects an additional sealing of the pores of the material and on cooling improves the bond between the solid particles present in the granule. The resulting welding flux is suitable for the welding of steels having high strengths and high notch impact values.

I claim:

1. A flux for the submerged arc welding of iron or steel, particularly for the welding of steels which contain chromium and/or for welding with steel electrodes which contain chromium, consisting of granules each of which comprises a plurality of particles of different materials agglomerated by a bonding agent, consisting substantially of at least one chromium oxide.

2. A method of making a welding flux which comprises mixing powdered flux ingredients with chromium trioxide, shaping the mixture into compacted bodies the size of which is at least equal to the required grain size of the flux, subjecting said bodies to a temperature exceeding the melting point of the chromium trioxide but not exceeding 600° C., cooling the product, and, if required, subdividing the bodies into granules, the order of said two last-mentioned steps being arbitrary.

3. A method as claimed in claim 2 in which the bodies or granules are heated to a temperature exceeding 250° C., whereby the chromium trioxide is at least partially converted into lower oxides.

4. A method as claimed in claim 2, in which the bodies or granules are heated to a temperature of at least 415° C.

5. A method of making a granular flux which comprises mixing powdered flux ingredients with a compound selected from the group comprising chromium trioxide and chromic acid, compacting the mixture and heating it to a temperature between 196° and 250° C., extruding the hot mass, and subdividing the resulting elongated bodies into granules.

6. A method as claimed in claim 5 in which the extruded product is subjected to a temperature of at least 250° C., preferably at least 415° C.

7. A method as claimed in claim 5 in which the mixture is extruded through one or more apertures the cross-sectional size of which in at least one direction is equal to the required grain size, whereby the subdivision of the resulting string or strings of material into granules of uniform size is facilitated.

References Cited

UNITED STATES PATENTS 2,751,478   6/1956   Jackson et al. _____ 148—26

FOREIGN PATENTS 710,764   6/1965   Canada.

L. DEWAYNE RUTLEDGE, *Primary Examiner.*

W. W. STALLARD, *Assistant Examiner.*